United States Patent [19]

Rispoli et al.

[11] 4,068,009
[45] Jan. 10, 1978

[54] BREAD CRUMB COATING COMPOSITION AND PROCESS

[75] Inventors: Joseph M. Rispoli, Massapequa Park; Morris A. Rogers, Mt. Vernon; Janice Raiford Shaw, Yonkers; Joseph J. Russo, New Windsor, all of N.Y.

[73] Assignee: General Foods Corporation, White Plains, N.Y.

[21] Appl. No.: 723,417

[22] Filed: Sept. 15, 1976

[51] Int. Cl.² ............................................. A23L 1/176
[52] U.S. Cl. ................................... 426/291; 426/296; 426/652; 426/293
[58] Field of Search ............... 426/92, 289, 291, 293, 426/296, 555, 652

[56] References Cited

U.S. PATENT DOCUMENTS

| | | | |
|---|---|---|---|
| 3,078,172 | 2/1963 | Libby | 426/293 |
| 3,236,654 | 2/1966 | Lipka et al. | 426/652 |
| 3,526,515 | 9/1970 | Werbin et al. | 426/302 |
| 3,586,512 | 6/1971 | Mancuso et al. | 426/95 |
| 3,666,491 | 5/1972 | Touba | 426/293 |
| 3,843,827 | 10/1974 | Lee et al. | 426/296 |

OTHER PUBLICATIONS

Fry King ®Crispy Coat, Marukai Trading Inc., Osaka, Japan.

*Primary Examiner*—Jeanette M. Hunter
*Attorney, Agent, or Firm*—Bruno P. Struzzi; Thomas V. Sullivan; Mitchell D. Bittman

[57] ABSTRACT

A bread crumb coating composition which, when coated onto a batter-coated comestible and then baked, imparts the resultant comestible with the taste, texture and appearance of a fried comestible. The bread crumb coating composition comprises bread crumbs consisting essentially of wheat flour, yeast and salt and having an elongated, porous and striated shape and structure, and a particle size wherein at least a majority of the crumbs by weight are retained on a USS 20 mesh screen after passing a USS 5 mesh screen, but not more than 10% of the crumbs by weight are retained on a USS 5 mesh screen. The bread crumbs are uniformly browned, and have an edible oil applied onto their surface.

18 Claims, 1 Drawing Figure

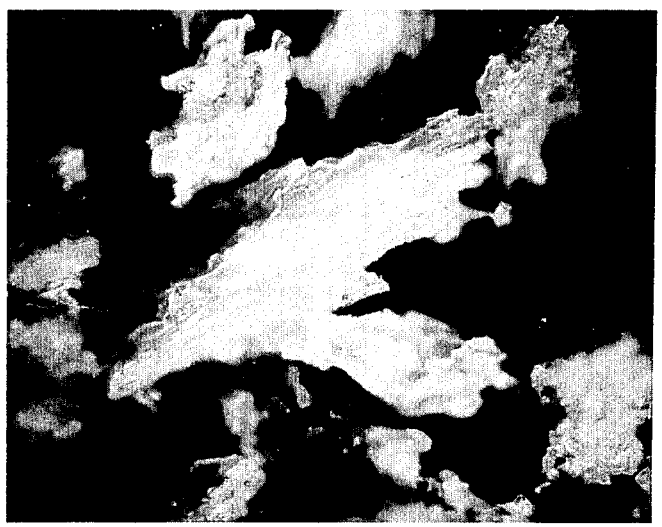

4,068,009

BREAD CRUMB COATING COMPOSITION AND PROCESS

BACKGROUND OF THE INVENTION

Comestibles such as meat, fish, poultry etc. are commonly batter coated, breaded and then cooked by pan frying or deep fat frying. This develops into a coating which is crispy and tasty, and has a uniform brown color. However, associated with such frying of comestibles is the undesirable messiness, expense and danger of frying as well as the dietary aspects of fried foods which are considered undesirable by some. A further drawback of fryiing is that the fried comestible coating loses its crispness and hence its consumer appeal within a relatively short time after frying.

Thus it becomes desirable to prepare comestibles with the taste, texture and appearance of fried comestibles without the undesirable characteristics of frying.

U.S. Pat. No. 3,586,512 by Mancuso et al. and U.S. Pat. No. 3,843,827 by Lee et al. both prepare a baked comestible with a fried texture and appearance. The Mancuso et al. patent does this by providing a dye system which changes color during cooking, while the Lee et al. patent provides a unique batter and dry mix coating. While both these systems are effective the Mancuso et al. patent has the drawback in that it requires a dye, while the Lee et al. patent has the drawback in that it requires a manufacturer to package the product in two separate pouches (i.e., one which contains ingredients for the batter and the other for the dry mix coating), and requires relatively complicated consumer preparation.

SUMMARY

Accordingly, it is a main object of this invention to provide a baked coated comestible with the taste, texture and appearance of a fried coated comestible.

It is a further object of this invention to provide a baked comestible coating which does not lose its crispness even after relatively long periods of time.

It is still a further object of this invention to provide a bread crumb coating composition which entails easy preparation for the consumer.

It is a further object of this invention to provide a coating with a high flavor impact in which the flavor is uniformly distributed on the coating.

It is a further object of this invention to provide a uniform coating of the comestible.

It is a further object of this invention to provide a coated comestible in which the comestible retains its moisture after baking.

Briefly stated, the objects of this invention are accomplished by coating a comestible with batter, then coating the batter-coated comestible with a unique bread crumb coating composition and then baking the batter-coated-crumb-coated comestible. The bread crumb coating composition comprises bread crumbs consisting essentially of wheat flour, yeast and salt, having an elongated, porous and striated shape and structure, and a particle size wherein at least a majority of the crumbs by weight are retained on a USS 20 mesh screen after passing a USS 5 mesh screen, and wherein not more than 10% of the crumbs by weight are retained on a USS 5 mesh screen. The bread crumbs are uniformly browned, and have from 1.5 to 40%, by weight of the bread crumbs, of an edible oil applied to their surface. Preferably, a seasoning is applied with the edible oil.

BRIEF DESCRIPTION OF THE DRAWING

The FIG. is a photomicrograph (10X magnification, incident light on shadowgraph) of the bread crumbs of the bread crumb coating composition.

DETAILED DESCRIPTION OF THE INVENTION

The bread crumb coating composition of this invention comprises bread crumbs consisting essentially of wheat flour, yeast and salt. Other ingredients such as seasonings, shortening, milk solids, sugar, minor amounts of other flours (e.g., rice, barley, soy etc.), whey solids, etc., may be added to the bread crumbs. However, it is preferred to apply any seasonings with the edible oil which is applied to the surface of the crumbs. The bread from which the bread crumbs are made can be prepared by conventional methods. However, when processing the bread and the bread crumbs care should be taken to use means whereby the bread crumbs of the specific shape, structure and particle size are obtained.

The shape, structure and particle size of the bread crumbs are critical. The shape and structure of the bread crumb as pictured in the Figure can be described as elongated, porous and striated. Typically, the length of one such crumb is approximately four times larger than either the width or height of the crumb.

Generally, the bread crumbs are of a particle size wherein a majority of the crumbs by weight are retained on a USS 20 mesh screen after passing a USS 5 mesh screen but not more than 10% of the crumbs by weight are retained on a USS 5 mesh screen. More specifically, the optimum distribution of particle sizes in the bread crumb coating composition and the preferred maximum distribution of each particle size are as follows:

| Mesh Size U.S. Screen | Optimum Distribution % of Coating Mix Composition | Preferred Maximum Distribution % Of Coating Mix |
| --- | --- | --- |
| +5 (on 5) | 0% | 10% |
| −5, +8 (through 5 on 8) | 30–40% | 90% |
| −8, +14 (through 8 on 14) | 30–40% | 100% |
| −14, +20 (through 14 on 20) | 15–25% | 85% |
| −20 (through 20) | 0–15% | 50% |
| −5, +20 (through 5 on 20) | 85–100% | 100% |

When the bread crumb coating composition comprises greater than 90%, by weight, of bread crumbs which passed through a USS 5 mesh screen but are retained on a USS 8 mesh screen the resultant baked comestible coating was judged to be of borderline acceptability in that the coating had a granular texture with poor adherence of the crumbs to the comestible. When the bread crumb coating composition comprises greater than 85%, by weight, of bread crumbs which passed through a USS 14 mesh screen but are retained on a USS 20 mesh screen the resultant baked comestible coating was also judged to be of borderline acceptability due to a gritty textured coating. Moreover, when the bread crumb coating composition comprises greater than 50%, by weight, of bread crumbs which passed through a USS 20 mesh screen the resultant baked comestible coating was judged unacceptable due to the gummy texture of the coating and loss of the coating's crispness and crispness retention as is commonly observed with ordinary bread crumbs. Further, when the bread crumb coating composition comprises a significant amount (i.e., greater than about 10%, by weight) of bread crumbs which are retained on a USS 5 mesh screen it was generally considered as undesirable since the resultant baked comestible coating was found to be nonuniform with a hard, glassy texture, and with poor adherence of the crumbs to the comestible.

The moisture content of the bread crumbs is not critical. However, generally it is preferred the moisture content be less than about 13% and the optimum moisture content be within the range of about 1-6%, basically for shelf-stability reasons.

It has been found that this bread crumb coating composition with its critical shape, structure and particle size of the bread crumbs does not become soggy or lose its crispness even after absorbing significant amounts of fat or oil and thereafter standing for a relatively long period of time. These unique characteristics enable a bread crumb coating composition to be prepared which, when applied onto a batter-coated comestible and baked, results in a comestible with the taste, texture and appearance of a fried comestible.

The bread crumbs are uniformly browned, typicaly by toasting, to impart the crumbs and the resultant baked coated comestible with a fried appearance. Without such uniform browning of the crumbs upon baking of the coated comestible there is encountered a speckled appearance due to different areas of the coating browning to different degrees.

To further aid in the formation of the appearance as well as the taste and texture of frying, an edible oil (preferably a vegetable oil) is applied to the surface of the bread crumbs. The edible oil is applied to the bread crumbs broadly within the range of about 1.5-40% by weight of the bread crumbs, preferably within the range of about 1.5-15% and optimaly at a level of about 6%. Preferably, the edible oil is a vegetable oil and is preferably applied by spraying, however, this is not meant to exclude other means of applying oil to the crumbs. Appropriate vegetable oils include corn oil, soybean oil, peanut oil, olive oil etc., or blends thereof.

Preferably seasoning is applied to the bread crumbs with the vegetable oil. This can be carried out by, for example, either blending the seasoning into the oil prior to applying the oil onto the surface of the bread crumbs or preferably mixing the seasoning with the bread crumbs and then applying the oil. Either way the seasoning is trapped on the bread crumb surface resulting in a high flavor impact when the baked comestible coating is eaten, while if the seasoning is baked into the crumbs a lot of this flavor impact is lost. Furthermore, when seasoning is so applied the result is a uniform distribution of flavor while if the seasoning were simply mixed in without the oil the seasoning would tend to separate from the crumb resulting in a non-uniform distribution. When seasoning such as paprika is used it has the further benefit of helping develop the desired crumb coloring. Examples of appropriate seasonings are sugar, salt, dextrose, monosodium glutamate, paprika, onion powder, garlic powder, etc. Coloring may also be employed however it is not considered necessary to obtain a desirable product.

The bread crumb coating composition is coated onto a batter-coated comestible which is then baked. The batter used to coat the comestible is not critical and may be of any formulation suitable for bread crumbs to adhere to as is common in the art. Some examples of suitable batters are egg, egg and water, egg and milk, flour, egg and milk, flour and water, flour and egg, flour dusting then water, flour and milk, starch and water, starch and milk, gum and water, gum and milk, barbecue sauce, etc. The comestible can be coated with batter by dipping, spraying, immersing etc. the comestible. Preferably, the comestible is first flour dusted prior to batter coating as this results in a more continuous adherent coating.

The batter-coated comestible can be coated with the bread crumb coating composition by means common in the art, such as applying the coating composition to the batter-coated comestible in a closed bag containing the coating composition, or completely covering the batter-coated comestible with the coating composition and then pressing the coating composition firmly onto the batter-coated comestible.

After this second coating step, the coated comestible is then placed in an oven and baked until done. The baking may be carried out in a microwave oven as well as a conventional oven. Generally the temperature in a conventional oven is within the range of about 325° to 450° F. Preferably the coated comestible is baked on a surface covered with a minimal amount of oil, i.e., at least a sufficient amount of oil to cover the surface. This is done not only to prevent sticking of the comestible to the surface but to enhance the development of the fried taste, texture and appearance of the baked comestible.

When the comestible is coated and baked according to the process of this invention the resultant comestible is found to have a continuous, uniform and heavy coating. This coating is caused by the interweaving and layering of the bread crumb particles and is found to be uniform even on irregular comestible surfaces.

The resultant comestible coating of this invention is also found to retain its crispness for an unusually long period of time. While coatings with conventional bread crumbs tend to become soggy within 30-45 minutes after frying the coated comestible, the coating of the baked coated comestible prepared by the process of this invention is found to be crisp when sampled 4 hours after baking. The baked coated comestible of this invention can also be frozen after cooking and when reheated the coating is surprisingly still found to be crisp.

Another surprising result is that the comestible itself after being coated and baked is found to be moist and to retain this moisture. It is theorized that the heavier uniform coating caused by the layering effect and interweaving of the bread crumb particles helps keep the moisture in the comestible, however, this is only intended as a theory.

Appropriate comestibles include such categories as meat, fish, poultry and vegetables. For example, chicken pieces, chicken cutlets, pork chops, fish fillets or vegetable strips are all suitable.

The following examples illustrate the various facets of the invention. It should be understood, however, that these examples are merely meant to be illustrative and the invention is not to be limited thereto.

EXAMPLE I

The following ingredients and process are employed to prepare the bread crumb coating composition:

|  | Parts/weight |
|---|---|
| High Gluten Bread Wheat Flour (12% Protein) | 64.04 |

-continued

| | Parts/weight |
|---|---|
| Water | 34.34 |
| Salt | 0.92 |
| Compressed Yeast | 0.70 |

The yeast is dissolved in five times its weight of lukewarm water and is allowed to stand. The flour and salt are sifted and blended. The yeast solution and remaining water are then added to the flour and salt, and blended for 10 minutes to develop a smooth dough.

The dough is covered to prevent crust formation and is placed in a 90°-100° F, 85% R.H. room. The dough is allowed to rise for ½ hour and is then punched down. The dough is divided into units weighing 4 pounds, rounded and placed into greased bread pans (18 inches × 4 inches pans with sliding tops) and covered. The dough is proofed an additional ½ hour and then baked at 350° F. for 1 hour. After cooling, the loaves (generally having a 20-45% moisture content) are cut into 2 inches × 2 inches × 4 units and the units passed through a hammer mill using a 1/5 to ⅜ inch screen opening with the knife edges forward at 1800 to 6000 RPM.

In a forced air dryer the bread crumbs are dried at 150° F. to about 10% moisture and then toasted at 300° F. to a desired browness. The bread crumbs are then screened to obtain an optimum particle size distribution, i.e., 36% through 5 on 8, 37% through 8 on 14, 20% through 14 on 20 and 7% through 20.

Then 150 parts/weight of the bread crumbs are placed in a coating kettle into which 24 parts/weight of a dry seasoning blend containing sugar, salt, dextrin, monosodium glutamate, paprika, onion powder, garlic powder and smoke flavored vegetable oil are added after which the crumbs are sprayed with 10 parts/weight of hydrogenated soybean oil.

EXAMPLE II

A 2½ pound chicken was cut up into 8 pieces which were washed and patted dry with a towel. Each chicken piece was dipped into a batter (one egg and ¼ cup of water) and the excess batter was allowed to run off. Then the batter-coated chicken piece was completely covered with the bread crumb coating composition as prepared in Example I (about 140 grams of coating composition for the 8 chicken pieces) and the coating composition was pressed firmly onto the batter-coated chicken piece.

The coated chicken pieces were then placed in an 11 inch × 15 inch baking pan which had ¼ cup of oil covering the pan surface. The pan with the chicken was then placed in an oven preheated to 400° F. The chicken pieces were baked for 25 minutes and then turned over and baked for an additional 25 minutes.

The resultant baked coated chicken was found to have the taste, texture and appearance of fried chicken. The baked coated chicken was found to have a continuous, uniform and heavy coating and to be very crisp and retain this crispness even after standing for 4 hours either at room temperature or in a refrigerator. The chicken itself was also found to be relatively moist and to remain moist upon standing.

EXAMPLE III

A fresh eggplant was cut into 8 slices, washed and patted dry. Each slice was dusted with all purpose flour (about ½ cup for the 8 slices), then dipped into a batter (one egg) and the excess batter was allowed to run off. The batter-coated eggplant slice was then coated with the bread crumb coating composition as prepared in Example I (about 120 grams of coating composition for the 8 slices).

The coated eggplant slices were then placed in an 11 inch × 15 inch baking pan which had ⅛ cup of oil covering the pan surface. The pan with eggplant was then placed in an oven preheated to 450° F. The eggplant was baked for 15 minutes, turned over and baked for an additional 10 minutes.

The resultant baked coated eggplant was found to have the taste, texture and appearance of fried eggplant. The coating was found to be uniform and crisp and to retain its crispness even after the eggplant was frozen and reheated.

What is claimed is:

1. Process for preparing a baked coated comestible with the taste, texture and appearance of a fried coated comestible comprising:
    coating a comestible with a batter;
    coating the batter-coated comestible with a bread crumb coating composition, said composition comprising bread crumbs consisting essentially of wheat flour, yeast and salt, having an elongated, porous and striated shape and structure, and a particle size wherein at least a majority of the crumbs by weight are retained on a USS 20 mesh screen after passing a USS 5 mesh screen and wherein not more than 10% of the crumbs by weight are retained on a USS 5 mesh screen, said bread crumbs being uniformly browned, and having 1.5 to 40%, by weight of the bread crumbs, of an edible oil applied to the surface of the bread crumbs; and
    then baking said comestible.

2. Process of claim 1 wherein the edible oil is a vegetable oil.

3. Process of claim 2 wherein a seasoning is applied with the vegetable oil.

4. Process of claim 3 wherein 1.5 to 15%, by weight of the bread crumbs, of the vegetable oil is applied to the crumb surface.

5. Process of claim 4 wherein the vegetable oil is applied by spraying.

6. Process of claim 5 wherein the seasoning is mixed with the bread crumbs prior to spraying the bread crumbs with the vegetable oil.

7. Process of claim 1 wherein said comestible is baked on a surface covered with a minimal amount of oil.

8. Process of claim 1 further comprising flour dusting the comestible prior to coating said comestible with the batter.

9. Process of claim 1 wherein up to 90% by weight of the bread crumbs pass through a USS 5 mesh screen and are retained on a USS 8 mesh screen, up to 100% by weight pass through a USS 8 mesh screen and are retained on a USS 14 mesh screen and up to 85% by weight pass through a USS 14 mesh screen and are retained on a USS 20 mesh screen.

10. Process of claim 9 wherein 30-40% by weight of the bread crumbs pass through a USS 5 mesh screen and are retained on a USS 8 mesh screen, 30-40% by weight pass through a USS 8 mesh screen and are retained on a USS 14 mesh screen, 15-25% by weight pass through a USS 14 mesh screen and are retained on a USS 20 mesh screen and 0-15% pass through a USS 20 mesh screen.

11. A bread crumb coating composition, which, when coated onto a batter-coated comestible and then baked imparts the resultant comestible with the taste, texture and appearance of a fried comestible, said composition comprising bread crumbs consisting essentially of wheat flour, yeast and salt, having an elongated, porous and striated shape and structure, and a particle size wherein at least a majority of the crumbs by weight are retained on a USS 20 mesh screen after passing a USS 5 mesh screen and wherein not more than 10% of the crumbs by weight are retained on a USS 5 mesh screen, said bread crumbs being uniformly browned, and having 1.5 to 40%, by weight of the bread crumbs, of an edible oil applied to the surface of the crumbs.

12. Bread crumb coating composition of claim 11 wherein the edible oil is a vegetable oil.

13. Bread crumb coating composition of claim 12 wherein a seasoning is applied with the vegetable oil.

14. Bread crumb coating composition of claim 13 wherein 1.5 to 15%, by weight bread crumbs, of the vegetable oil is applied to the surface of the crumb.

15. Bread crumb coating composition of claim 14 wherein the vegetable oil is applied by spraying.

16. Bread crumb coating composition of claim 15 wherein the seasoning is mixed with the bread crumbs prior to spraying the bread crumbs with the vegetable oil.

17. Bread crumb coating composition of claim 11 wherein up to 90% by weight of the bread crumbs pass through a USS 5 mesh screen and are retained on a USS 8 mesh screen, up to 100% by weight pass through a USS 8 mesh screen and are retained on a USS 14 mesh screen and up to 85% by weight pass through a USS 14 mesh screen and are retained on a USS 20 mesh screen.

18. Bread crumb coating composition of claim 17 wherein 30–40% by weight of the bread crumbs pass through a USS 5 mesh screen and are retained on a USS 8 mesh screen, 30–40% by weight pass through a USS 8 mesh screen and are retained on a USS 14 mesh screen, 15–25% by weight pass through a USS 14 mesh screen and are retained on a USS 20 mesh screen and 0–15% pass through a USS 20 mesh screen.

* * * * *